US009486079B2

(12) United States Patent
Romero

(10) Patent No.: US 9,486,079 B2
(45) Date of Patent: Nov. 8, 2016

(54) CHAIR WITH SEAT DEPTH ADJUSTMENT AND BACK SUPPORT

(75) Inventor: Francisco Romero, Los Angeles, CA (US)

(73) Assignee: Office Master Inc., Ontario, CA (US)

( * ) Notice: Subject to any disclaimer, the term of this patent is extended or adjusted under 35 U.S.C. 154(b) by 190 days.

(21) Appl. No.: 13/697,397

(22) PCT Filed: Jun. 9, 2011

(86) PCT No.: PCT/US2011/039693
§ 371 (c)(1),
(2), (4) Date: Dec. 18, 2012

(87) PCT Pub. No.: WO2011/156536
PCT Pub. Date: Dec. 15, 2011

(65) Prior Publication Data
US 2013/0154314 A1 Jun. 20, 2013

Related U.S. Application Data

(60) Provisional application No. 61/353,381, filed on Jun. 10, 2010.

(51) Int. Cl.
| | |
|---|---|
| A47C 1/032 | (2006.01) |
| A47C 1/023 | (2006.01) |
| A47C 7/38 | (2006.01) |
| A47C 7/46 | (2006.01) |
| A47C 1/034 | (2006.01) |

(Continued)

(52) U.S. Cl.
CPC ........... *A47C 1/03294* (2013.01); *A47C 1/023* (2013.01); *A47C 1/034* (2013.01); *A47C 7/38* (2013.01); *A47C 7/425* (2013.01); *A47C 7/46* (2013.01); *A47C 7/54* (2013.01)

(58) Field of Classification Search
USPC ...................................... 297/343, 342, 300.1
See application file for complete search history.

(56) References Cited

U.S. PATENT DOCUMENTS

| | | | | |
|---|---|---|---|---|
| 711,412 A | * | 10/1902 | Archambeault | ................. 297/61 |
| 1,802,608 A | * | 4/1931 | Krause | .......................... 297/343 |
| 4,840,426 A | * | 6/1989 | Vogtherr et al. | ........... 297/300.5 |

(Continued)

FOREIGN PATENT DOCUMENTS

CA 2101905 A1 2/1994

OTHER PUBLICATIONS

Canadian Office Action dated Oct. 1, 2014.
(Continued)

*Primary Examiner* — David E Allred
(74) *Attorney, Agent, or Firm* — Andrus Intellectual Property Law, LLP

(57) ABSTRACT

An office chair including a linking mechanism between a movable chair seat and a pivotable chair back. The mounting arrangement between the chair back and the chair seat includes swing arm assembly that is pivotally connected to the chair seat. When the chair seat moves forward, the swing arm assembly moves with the chair seat and causes the chair back to pivot and move relative to a stationary support arm. The stationary support arm includes a curved support face that moves within a movement slot formed on the swing arm assembly. The movement slot includes a roller that helps guide relative movement between the two components. The chair seat includes a thigh support portion that allows the user to adjust the seat depth as desired.

19 Claims, 13 Drawing Sheets

(51) Int. Cl.
*A47C 7/42* (2006.01)
*A47C 7/54* (2006.01)

(56) References Cited

U.S. PATENT DOCUMENTS

| | | | |
|---|---|---|---|
| 5,288,138 A * | 2/1994 | Stulik et al. | 297/302.1 |
| 5,324,093 A * | 6/1994 | Sugiyama | 297/15 |
| 5,582,459 A | 12/1996 | Hama et al. | |
| 6,095,611 A | 8/2000 | Bar et al. | |
| 6,164,712 A * | 12/2000 | Ajisaka et al. | 296/65.03 |
| 6,250,715 B1 | 6/2001 | Caruso et al. | 297/303.1 |
| 6,375,261 B1 * | 4/2002 | Link | 297/284.11 |
| 6,394,548 B1 * | 5/2002 | Battey et al. | 297/342 |
| 6,454,353 B1 * | 9/2002 | Knaus | 297/284.11 |
| 6,685,267 B1 * | 2/2004 | Johnson et al. | 297/300.1 |
| 6,739,651 B1 * | 5/2004 | Barefoot | 297/118 |
| 7,270,371 B2 * | 9/2007 | Adragna et al. | 297/14 |
| 7,472,957 B2 * | 1/2009 | Ferry et al. | 297/343 |
| 7,611,202 B2 * | 11/2009 | Johnson et al. | 297/343 |
| 7,669,929 B2 * | 3/2010 | Simon et al. | 297/284.11 |
| 2003/0111888 A1 * | 6/2003 | Brennan | 297/316 |
| 2004/0155502 A1 | 8/2004 | Johnson et al. | |
| 2005/0046254 A1 | 3/2005 | Knoblock et al. | |
| 2005/0242634 A1 * | 11/2005 | Serber | 297/216.1 |
| 2008/0100121 A1 * | 5/2008 | Serber | 297/452.1 |
| 2010/0109401 A1 * | 5/2010 | Booth et al. | 297/284.11 |
| 2011/0084530 A1 * | 4/2011 | Lockwood et al. | 297/342 |
| 2012/0043794 A1 * | 2/2012 | Kramer et al. | 297/284.3 |
| 2012/0139300 A1 * | 6/2012 | Marais et al. | 297/68 |
| 2012/0205952 A1 * | 8/2012 | Takeuchi et al. | 297/300.1 |
| 2014/0103688 A1 * | 4/2014 | Wilson | 297/284.7 |
| 2014/0300161 A1 * | 10/2014 | Beroth et al. | 297/340 |
| 2014/0300162 A1 * | 10/2014 | Udriste et al. | 297/340 |

OTHER PUBLICATIONS

Canadian Office Action dated Jan. 7, 2014.

* cited by examiner

CHAIR WITH SEAT DEPTH ADJUSTMENT AND BACK SUPPORT

CROSS-REFERENCE TO RELATED APPLICATIONS

This application claims priority to PCT/US2011/039693, filed Jun. 9, 2011, and published in English on Dec. 15, 2011 as publication number WO 2011/156536, which claims priority to US Provisional Application No. 61/353,381, filed Jun. 10, 2010, incorporated herein by reference.

BACKGROUND OF THE INVENTION

The present disclosure generally relates to an office chair. More specifically, the present disclosure relates to an office chair that allows for pivoting movement of the chair back and forward movement of the chair seat during reclining by the user.

Presently, many different types of office chairs exist that allow the chair back to recline and the chair seat to move forward as the chair back reclines. The dual movement of the chair seat and the chair back enhances comfort for the user.

Although office chairs exist that allow the chair back to pivot and the chair seat to move forward, most of these office chairs include complex mechanical linkages to couple the movement of the chair back and the chair seat. The complex arrangement between the chair back and the chair seat increases the cost of manufacturing the office chair and increases the cost and time to assemble such a chair.

Many currently available office chairs also include various different adjustment devices that allow an occupant to tailor the chair to the particular user. Once again, many of these currently available chairs include complex mechanical components that increase the complexity and cost of assembling and manufacturing the office chair.

SUMMARY OF THE INVENTION

The present disclosure generally relates to an office chair in which the reclining movement of the user both pivots the chair back and causes the chair seat to move forward. The office chair includes a stationary seat base that is mounted to a pedestal assembly. The seat base receives a seat pan assembly including a seat pan that is movably mounted relative to the stationary seat base. A series of roller guides and support rails allows the seat pan to move relative to the stationary seat base. A bias spring is positioned between the seat base and the seat pan to create a bias force that urges the seat pan to a retracted position. Since the chair back is coupled to the seat pan through a swing arm assembly, the bias spring also urges the chair back to the upright support position.

The swing arm assembly is pivotally mounted to the seat pan assembly at both a first end and a second end. The first and second ends of the swing arm assembly are pivotally mounted to opposite sides of the seat pan such that the chair back can recline upon force applied by the chair occupant. When the chair back reclines, the seat pan moves forward and the swing arm assembly moves with the seat pan. The swing arm assembly extends around the rear of the chair back.

A chair back is securely mounted to the swing arm. The chair back is supported by the swing arm and moves along with the swing arm. A support bar is mounted to the seat base and extends rearwardly of the seat pan. The support bar engages a roller that is fixed to the swing arm. The support bar includes a curved support face along which the fixed roller travels. The roller which has a convex cross section mates with the concave cross section of the curved support face of the support bar. This keeps the roller centered along the curved support face. The swing arm assembly is positively connected to the support bar by the shark fin which is connected to the swing arm.

When a user exerts a force against the seat back, the entire swing arm pivots about its connection to the seat pan. The pivoting movement of the swing arm causes the chair back to recline. The reclining movement of the chair back causes the roller to travel along the curved support face to provide adequate support for the chair back. As the chair back reclines and moves relative to the stationary support bar, the movement of the swing arm along the stationary support bar causes the seat pan to move forward along a longitudinal axis relative to the stationary seat base. A bias spring is positioned between the stationary seat base and the seat pan to restrict the movement of the seat pan as described. In this manner, the bias spring provides a bias force to hold the chair back and chair seat in a retracted, upright position.

The office chair of the present disclosure further includes a seat pad that is positioned on the seat pan for movement with the seat pan. The seat pad has a depth from a front edge to a rear edge that can be adjusted through use of an adjustment device. The adjustment device is mounted to the seat pan for movement with the seat pan. The adjustment device can be operated by the seat occupant to modify the depth of the seat pad from the front edge surface to the rear edge surface.

The office chair includes a pair of adjustable arms positioned on opposite sides of the chair seat. Each of the adjustable arms is mounted to the seat pan such that the arms move along with the forward movement of the seat pan.

In one embodiment of the disclosure, the office chair includes a lumbar support pad that can be selectively positioned on the chair back. The lumbar support pad can be positioned in one of a series of slots formed in the chair back such that the seat occupant can modify the position of the lumbar support pad.

In addition to the lumbar support pad, the office chair can include an adjustable head rest assembly mounted to the chair back. The adjustable head rest assembly includes a head rest and a head rest pad. In one embodiment of the disclosure, the head rest pad and the lumbar support pad are identical components and are thus interchangeable.

The height of the head rest is controlled by the movement of a head rest support arm relative to a stationary mounting bracket. In one embodiment, one or more friction elements are positioned between the movable support arm and the stationary mounting bracket to control the vertical position of the head rest.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
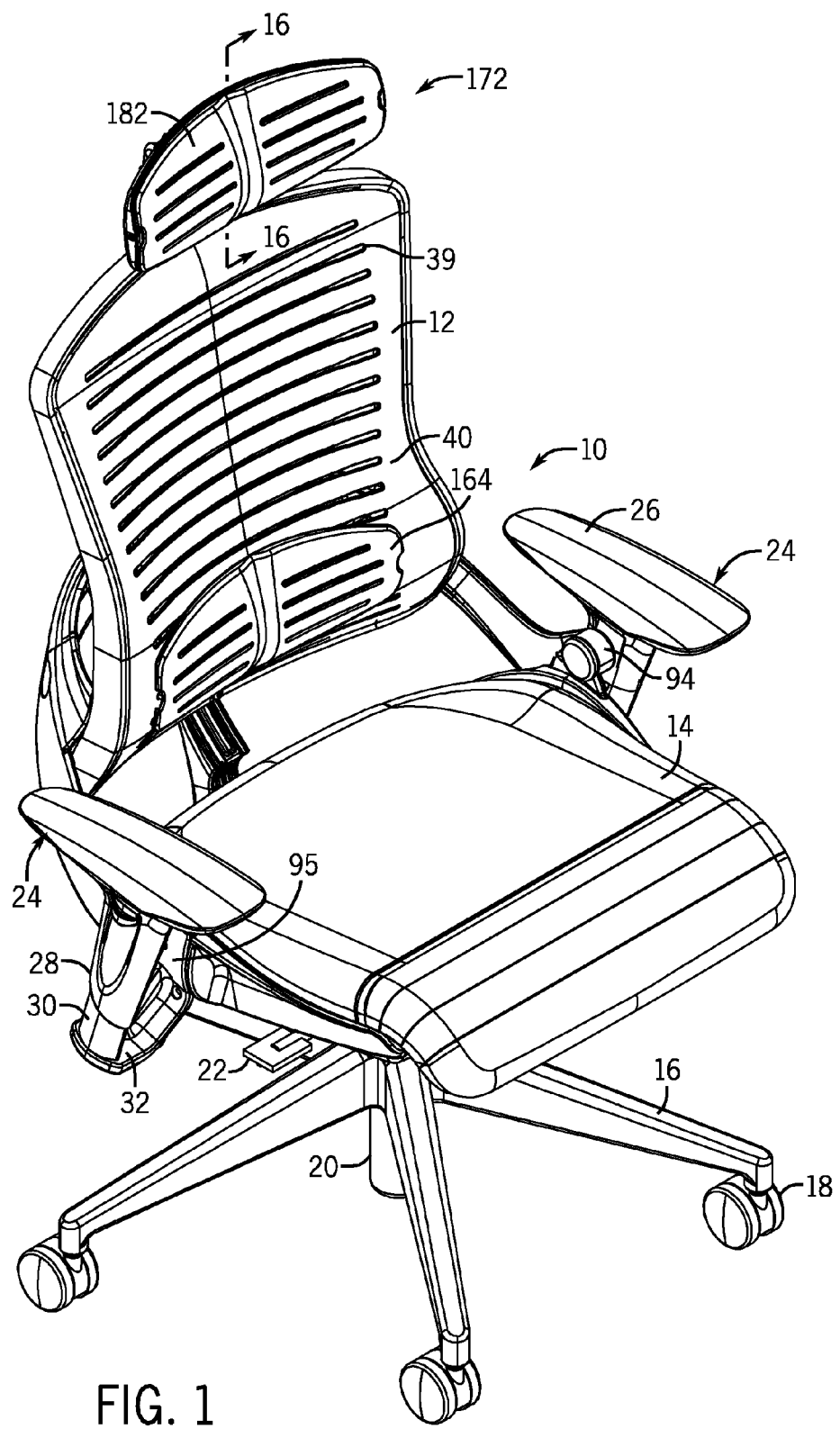
FIG. 1 is a front isometric view of an office chair constructed in accordance with the present disclosure.

FIG. 1 generally illustrates an office chair 10 constructed in accordance with one embodiment of the disclosure. The office chair 10 generally includes a chair back 12 and a chair seat 14 supported about a pedestal base 16. The pedestal base 16 includes a plurality of caster wheels 18 that allow the base to move the chair as is well known. The pedestal base 16 includes a gas assisted lift mechanism 20 controlled by lever 22 in a conventional manner.

Figure 2:
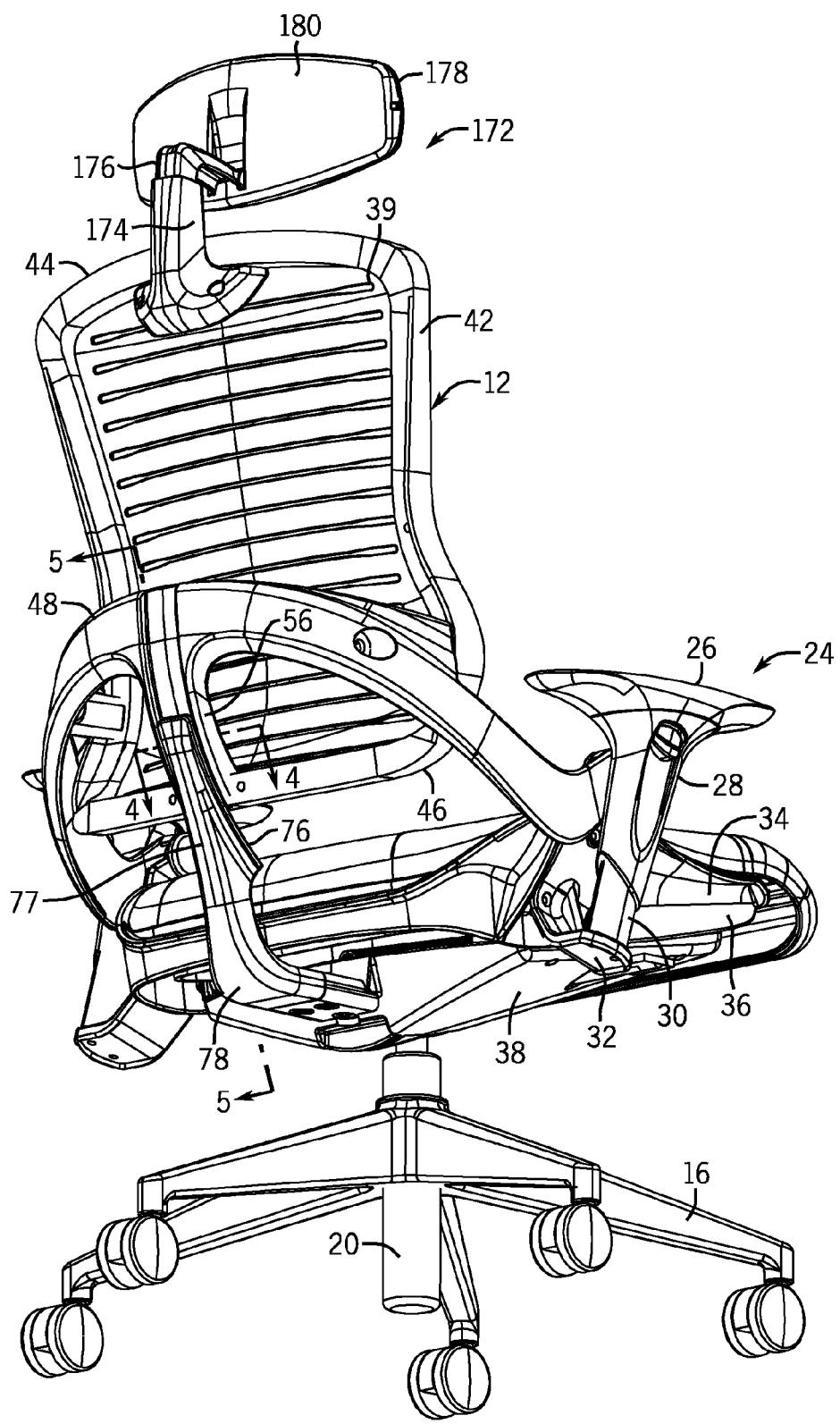
FIG. 2 is a rear isometric view illustrating the chair back and the swing arm assembly.

The office chair 10 includes a pair of arms 24 each having a padded upper portion 26 mounted to a lower adjustment tube 28. The lower adjustment tube 28 is movable along a stationary post 30. The stationary post 30, in turn, is supported by an attachment bracket 32. The attachment bracket 32 is securely attached to a sidewall 34 of a seat pan 36, as is best shown in FIG. 2. The seat pan 36 is a plastic, molded component that is movable along a longitudinal axis relative to seat base 38 in a manner to be described in much greater detail below. As illustrated in FIG. 2, the seat base 38 is mounted to the lift mechanism 20 and is thus movable vertically relative to the pedestal base 16.

As illustrated in FIGS. 1 and 2, the chair back 12 is a molded component that includes a series of horizontal slats separated by a series of spaced slots 39 formed in a front face surface 40 of the chair back. The chair back 12 is defined at its outer perimeter by an outer frame 42. The outer frame 42 defines the outer periphery of the chair back 12 and provides the required strength and rigidity for the chair back 12. The chair back 12 includes a top edge 44 and a bottom edge 46. The front face 40 is preferably configured to provide a flexible and comfortable contact surface for a seat occupant.

Figure 3:
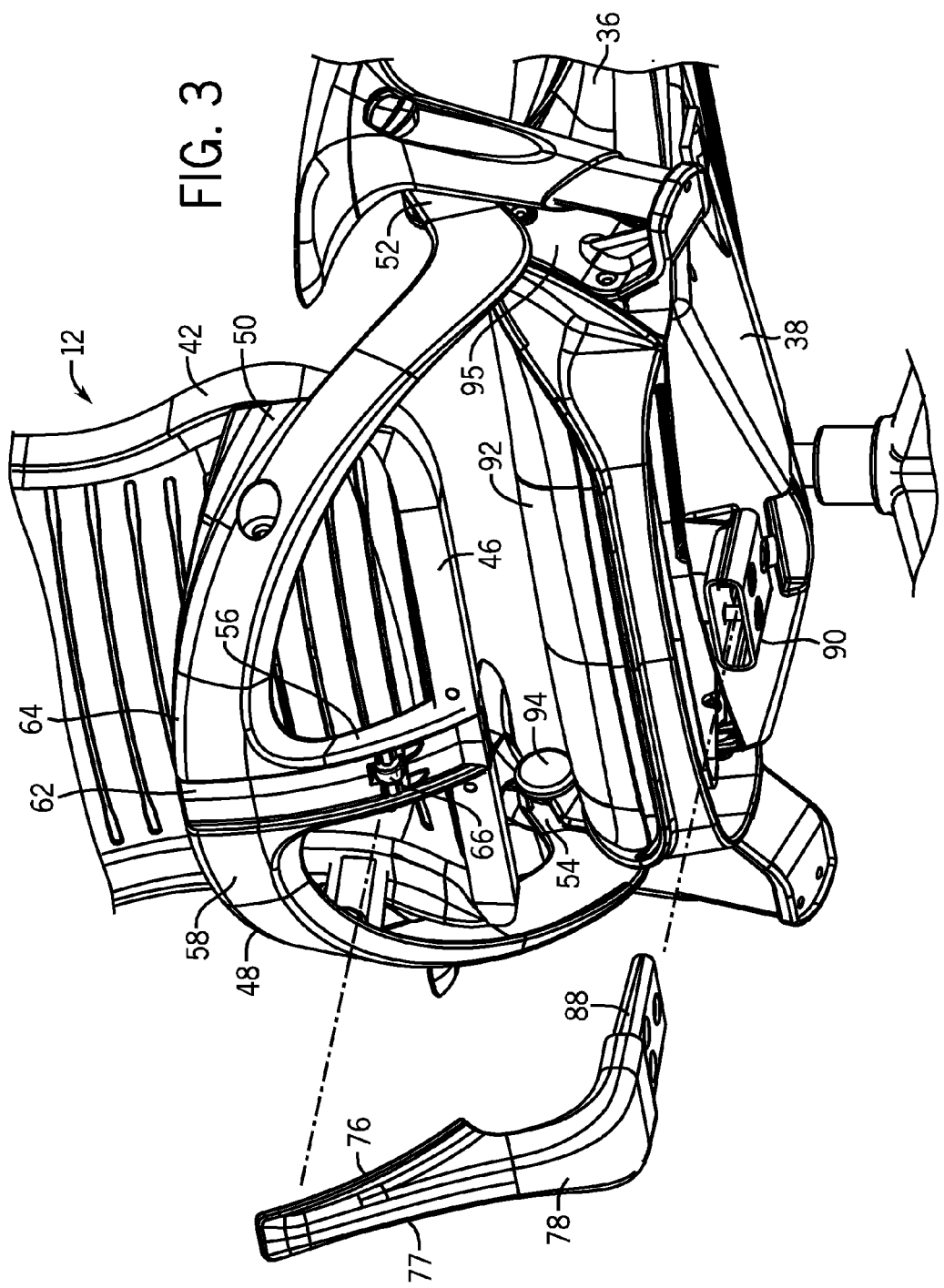
FIG. 3 is a magnified, partially exploded rear view showing the positioning of the support bar.

Referring back to FIGS. 2 and 3, the chair back 12 is securely connected to a swing arm 48. As can be seen in FIGS. 2 and 3, the outer frame 42 of the chair back 12 is connected to the swing arm 48 at a pair of side attachment portions 50 as well as at the bottom edge 46.

Figure 5:
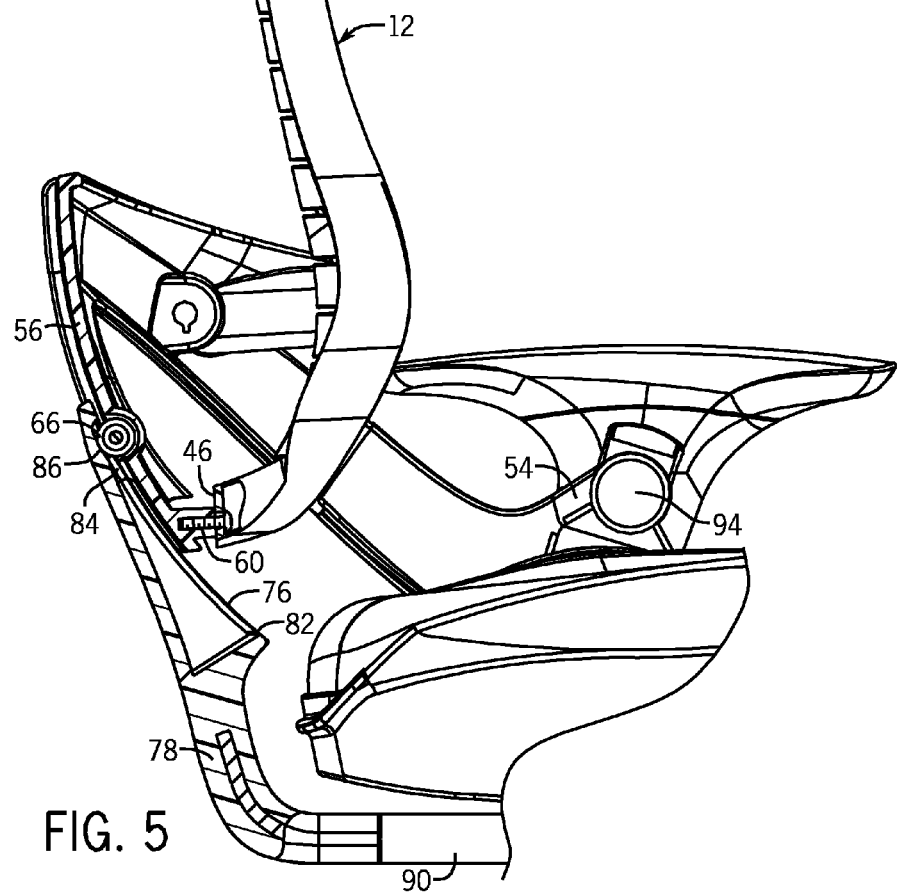
FIG. 5 is a section view taken along line 5-5 of FIG. 2.

As illustrated in FIGS. 3 and 5, the swing arm 48 is pivotably connected to the seat pan 36 at both a first end 52 and a second end 54. As illustrated in FIG. 3, the swing arm 48 is a curved, molded plastic component that extends upward and around the chair back 12. The swing arm 48 includes a support column 56 that extends downwardly from the upper, back portion 58 of the swing arm 48 and is joined to the bottom edge 46 of the chair back 12. As illustrated in FIG. 5, a connector 60 joins the support column 56 to the bottom edge 46 of the chair back 12 such that the two components can be formed separately and later connected.

Referring back to FIG. 3, the support column 56 defines a guide track 62. The guide track 62 is recessed from the outer surface of the swing arm 48 and extends from a top edge 64 of the swing arm to the bottom edge 46 of the chair back, as illustrated in FIG. 4.

Figure 4:
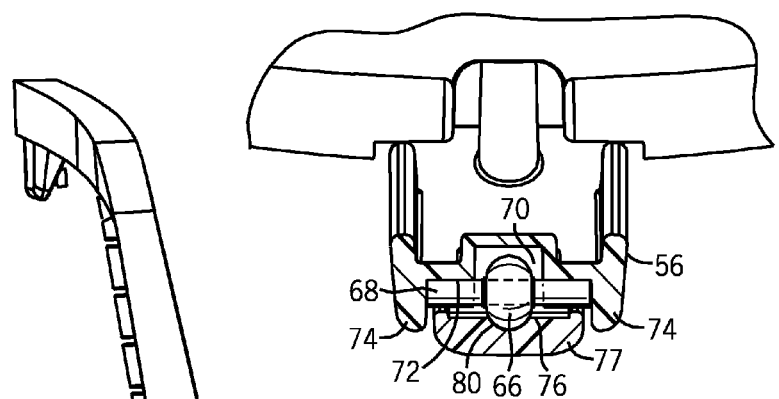
FIG. 4 is a section view taken along line 4-4 of FIG. 2.

Referring now to FIGS. 3 and 4, a roller 66 is mounted within the guide track 62. The roller 66 is supported by a roller shaft 68, as best shown in FIG. 4. The roller 66 is positioned within a cavity 70 such that a portion of the roller 66 extends past the outer surface 72 that defines the guide track 62. As previously described, the guide track 62 is defined by a pair of outer shoulders 74 formed as part of the support column 56.

Referring back to FIGS. 2 and 3, the support column 56 of the swing arm 48 receives a curved support face 76 formed on a support end 77 of a back support bar 78. As illustrated in FIGS. 2 and 3, the curved support face 76 of the back support bar 78 has a width that generally corresponds to the width of the guide track 62 formed in the support column 56.

Referring now to FIG. 4, the support end 77 of the support bar includes the curved support face 76. The support face 76 includes a recessed roller guide 80 which receives the roller 66 as illustrated. Thus, as the support column 56 moves relative to the stationary support bar 78, the roller 66 aids in guiding the relative movement therebetween.

Referring to FIG. 5, the support face 76 extends between a lower end 82 and an upper end 84. When the chair back 12 is in its upright position, the roller 66 is received within a recessed slot 86. The recessed slot 86 is recessed from the otherwise curved support face 76. The recessed slot 86 creates resistance for the user in the upright position at the onset of recline without use of lock out paddles or levers. The user can overcome this feature by applying more recline force and reclining fully in the chair.

Referring back to FIG. 3, the arc and curvature of the support face 76 is selected to urge the chair back 12 into the upright position shown. Further, the shape and curvature of the support face 76 defines the reclining movement of the chair back and the forward movement of the chair seat, as will be discussed in much greater detail below.

Referring back to FIG. 3, an attachment portion 88 of the support bar 78 is securely connected to a mounting bracket 90 attached to the seat base 38. In this manner, the support bar 78 is securely mounted to the seat base 38 and provides a rigid support brace for the swing arm 48.

Figure 8:
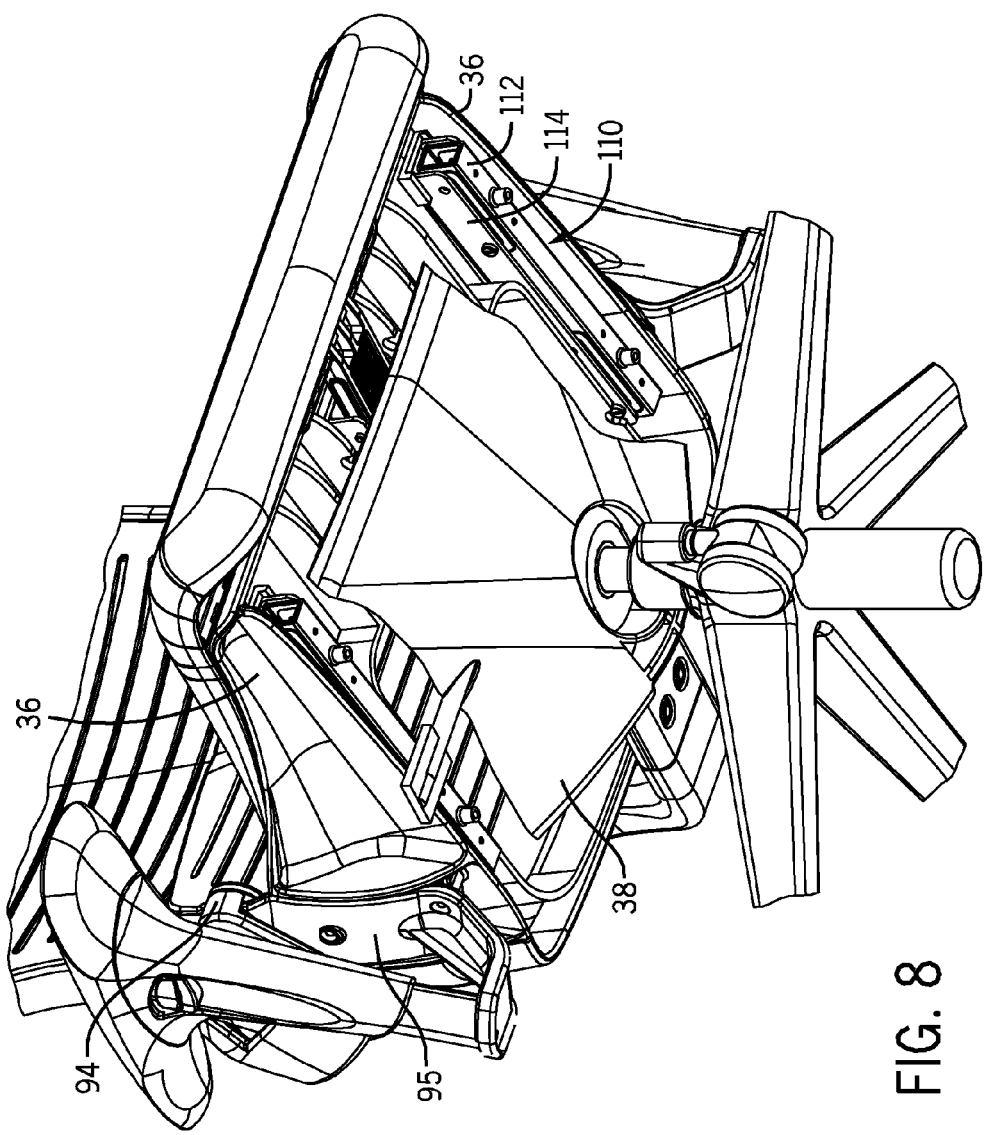
FIG. 8 is a bottom, partially removed view of the office chair.

When a user is seated on the chair pad 92 that defines a portion of the chair seat, if the user leans back against the chair back 12, the swing arm 48 pivots about the pair of spaced hip pivots 94 that join the spaced first and second ends 52, 54 of the swing arm to arm brackets 95 that are securely connected to the seat pan 36 (see FIG. 8). The pivoting movement of the swing arm 48 causes the top edge 64 of the swing arm 48 to move downward, thereby exerting a force on the arm brackets and causing the seat pan 36 to move forward. The downward and forward movement of the swing arm 48 causes the support column 56 to move downward against the stationary support face 76 of the support bar 78. As described previously, the roller 66 aids in guiding the relative movement between the support column 56 and the stationary support bar 78.

Figure 6:
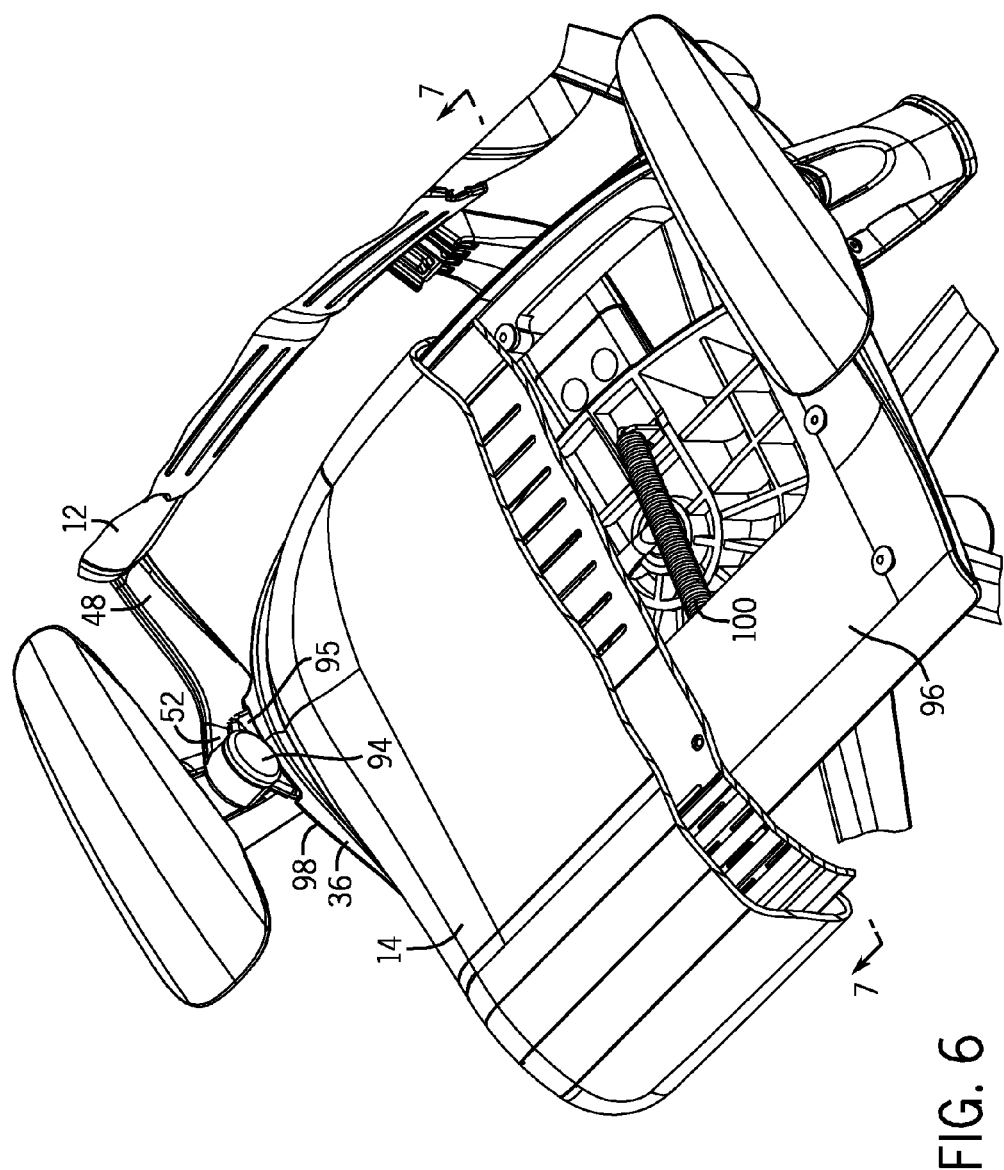
FIG. 6 is a partially exploded view illustrating the components of the chair seat.

Referring now to FIG. 6, the first end 52 of the swing arm 48 is clearly shown as being connected to a top end of arm bracket 95 at the hip pivot 94. As described previously, the arm bracket 95 is securely attached to the seat pan 36. The seat pan 36 includes a generally flat top surface 96 and a pair of protruding side edges 98. The side edges 98 define the width of the chair seat and include a removed area that allows for the pivoting connection between the swing arm 48 and the arm brackets 95 at the hip pivot 94.

Figure 7:
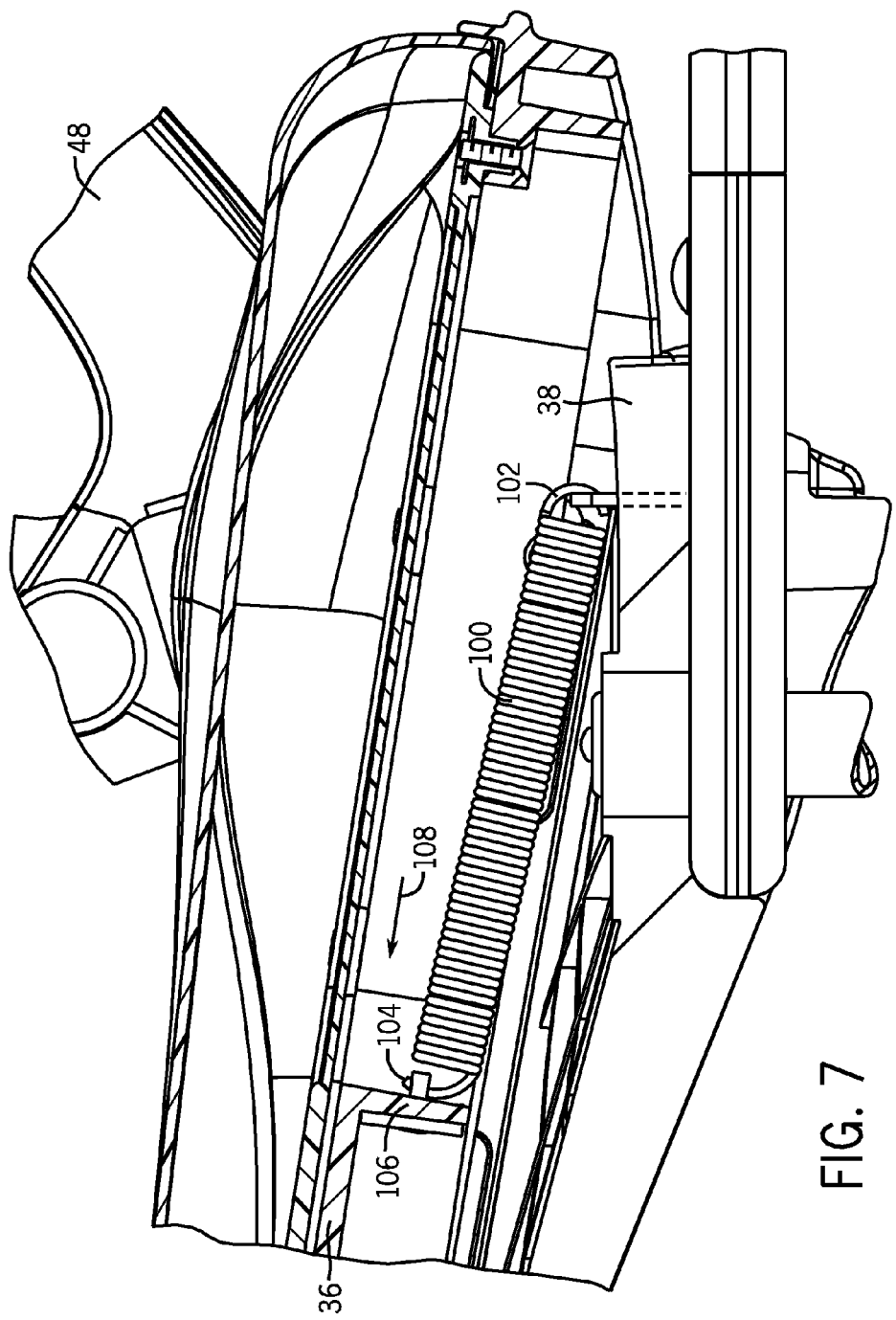
FIG. 7 is a section view taken along line 7-7 of FIG. 6.

As illustrated in FIGS. 6 and 7, a bias spring 100 has its first end 102 securely attached to the seat base 38 while the second end 104 is connected to an attachment flange of the seat pan 36. As illustrated in FIGS. 6 and 7, the bias spring 100 creates a bias force that urges the seat pan 36 into the retracted position shown in FIGS. 6 and 7.

As described previously, when a user is present on the chair seat 14 and leans back, the weight of the user urges the chair back 12 to recline. Since the chair back 12 is connected to the swing arm 48, the reclining motion of the chair back 12 causes the swing arm 48 to pivot about the pair of hip pivots 94. The pivoting movement of the swing arm exerts a force that urges the seat pan 36 to move forward along a longitudinal axis that bisects the stationary seat base 38. The forward movement of the seat pan 36 relative to the stationary seat base is initially counteracted by the bias force created by the bias spring 100. However, if the reclining force created by the seat occupant exceeds the bias force of the spring 100, the seat pan 36 moves forward in the direction shown by arrow 108 in FIG. 7. As previously described with reference to FIG. 5, the slot 86 formed in the support face 76 also serves as a detent that resists the initial pivoting movement of the chair back.

Figure 11:
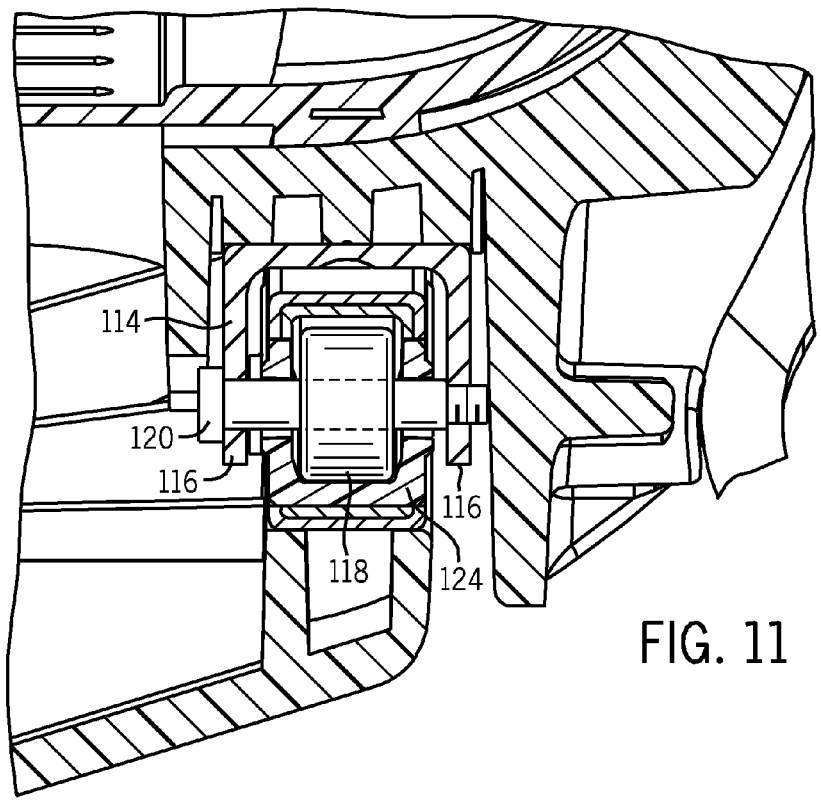
FIG. 11 is a section view taken along line 11-11 of FIG. 9.

Referring now to FIG. 8, the relative movement between the seat base 38 and the seat pan 36 is facilitated by a pair of guide rail assemblies 110. The guide rail assemblies 110 are spaced near the outer edges of the seat pan 36 and seat base 38. As illustrated in FIG. 8, a pair of lower, stationary roller guides 112 are mounted to the seat base 38. A guide rail 114 is securely attached to the seat pan 36. Each of the guide rails 114 is a generally U-shaped member having a pair of depending sidewalls 116, as shown in FIG. 11. A series of rollers 118 are mounted within the guide rails 114 by support axles 120.

Figure 9:
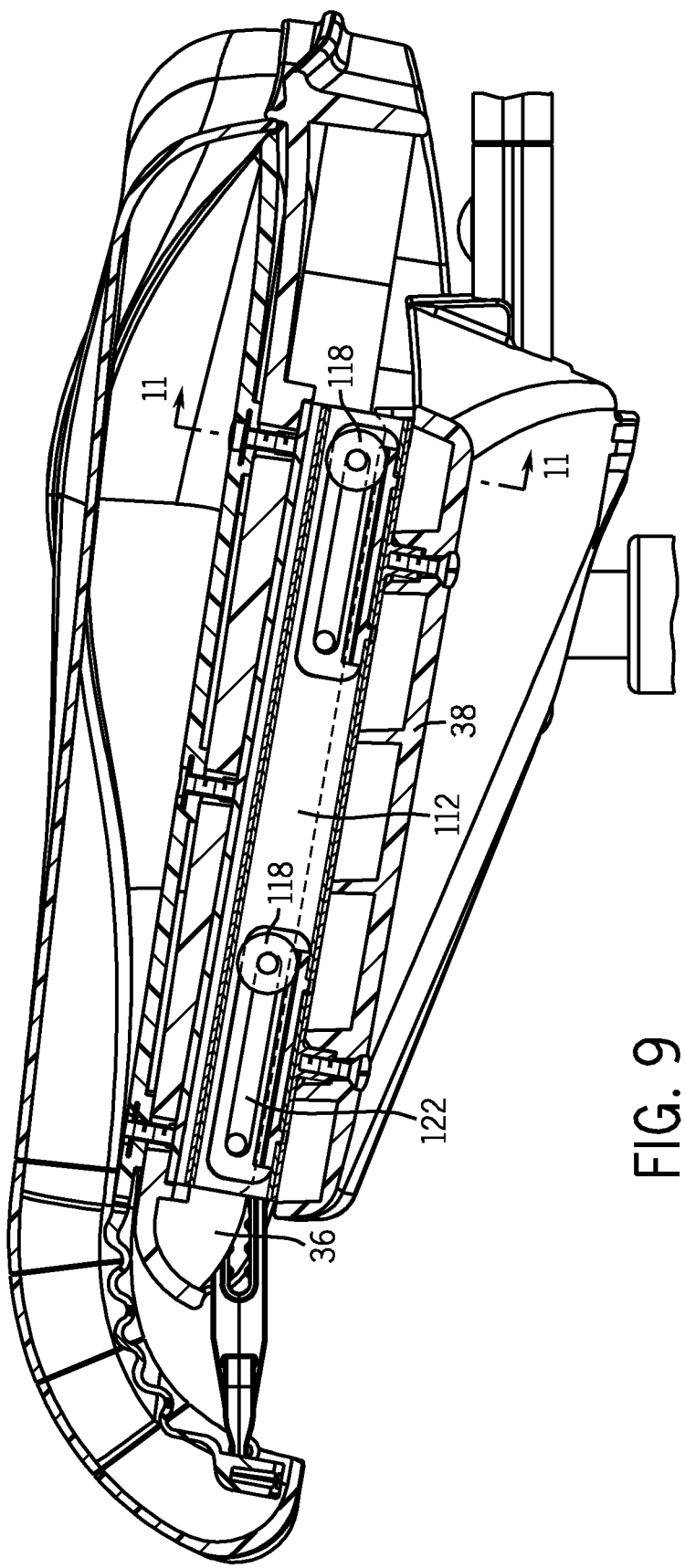
FIG. 9 is a section view illustrating the mounting arrangement between the seat base and the seat pan.
Figure 10:
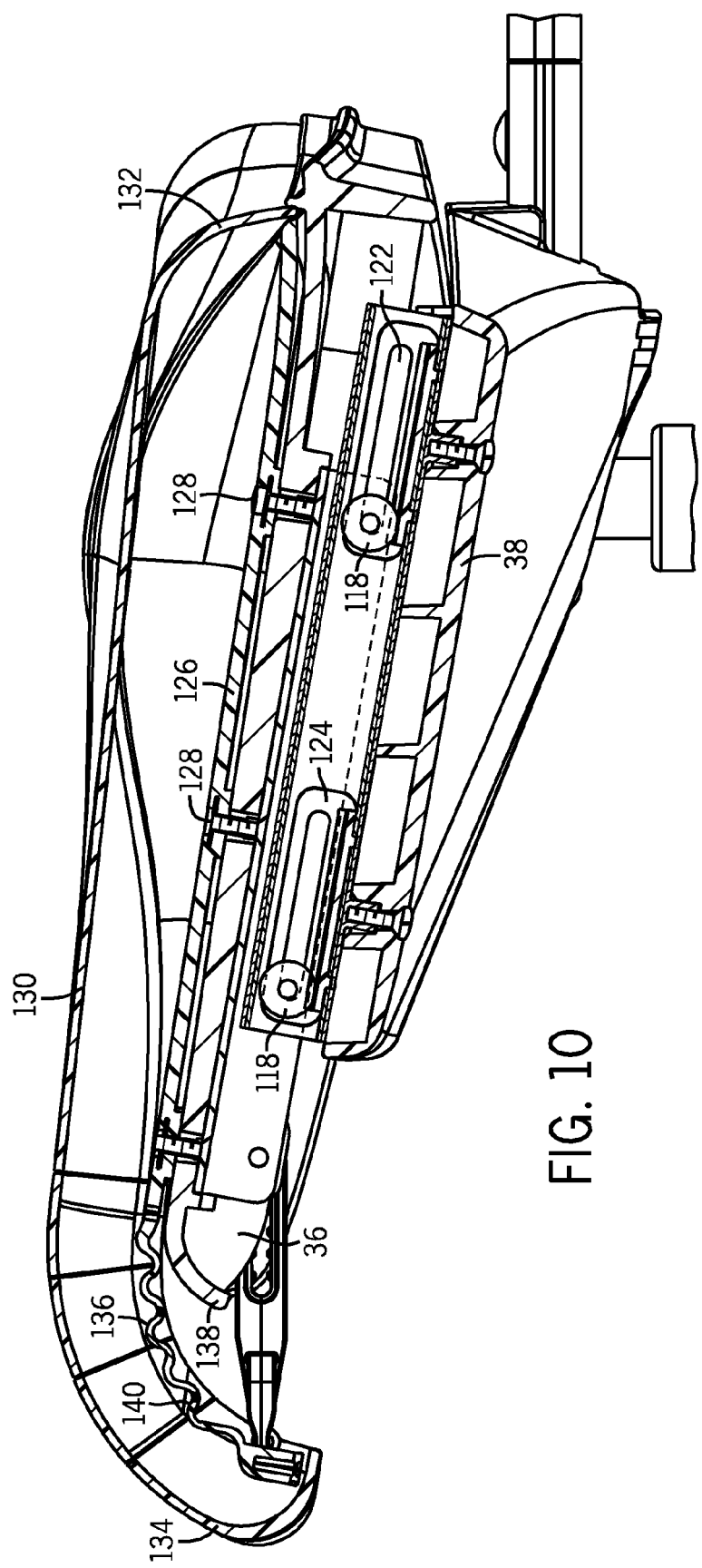
FIG. 10 is a section view similar to FIG. 9 showing the movement of the seat pan relative to the seat base.

Referring now to FIGS. 9 and 10, when the seat pan 36 is in its retracted position relative to the seat base 38, each of the rollers 118 is positioned near a rear end of a guide slot 122 defined in the roller guides 112. As previously described, the bias spring positioned between the seat pan and the seat base urges the seat pan 36 into this retracted position.

When a user reclines against the seat back, the seat pan 36 moves forward relative to the seat base 38, which can be seen by a comparison between FIGS. 9 and 10. During this forward movement, the rollers 118 move toward a front end of the guide slots 122 until the rollers contact a front edge of the guide slot 122. The contact between the rollers and the front edge limit the forward movement of the seat pan 36 relative to the seat base 38. In the embodiment shown in FIG. 10, a wear element 124 defines the guide slots 122 and create a wear resistant surface along which the rollers 118 and axles 120 can move, as illustrated in FIG. 11.

As can be seen in FIGS. 9 and 10, the seat base 38 is inclined relative to horizontal such that when the seat pan moves from the retracted position of FIG. 9 to the extended position of FIG. 10, the movement must overcome the effect of gravity as on the seat occupant. The inclined configuration of the seat base 38 creates an additional bias force to urge the seat pan into the retracted position of FIG. 9.

Referring back to FIG. 10, the seat pan 36 receives an inner seat member 126. The inner seat member 126 is attached to the seat pan by a series of connectors 128. Preferably, the inner seat member 126 is formed from either a flexible plastic material or a thin metal material, depending upon the designer requirements. The inner seat member 126, in turn, receives a padded seat cushion 130 that extends from a rear end 132 to a front end 134.

The inner seat member 126 includes a thigh support portion 136 that extends past the front end 138 of the seat pan 36. The thigh support portion 136 includes a series of convoluted sections 140 that allow the thigh support portion 136 to be adjusted. As illustrated in FIG. 10, the thigh support portion 136 is positioned beneath the seat cushion 130.

Figure 13:
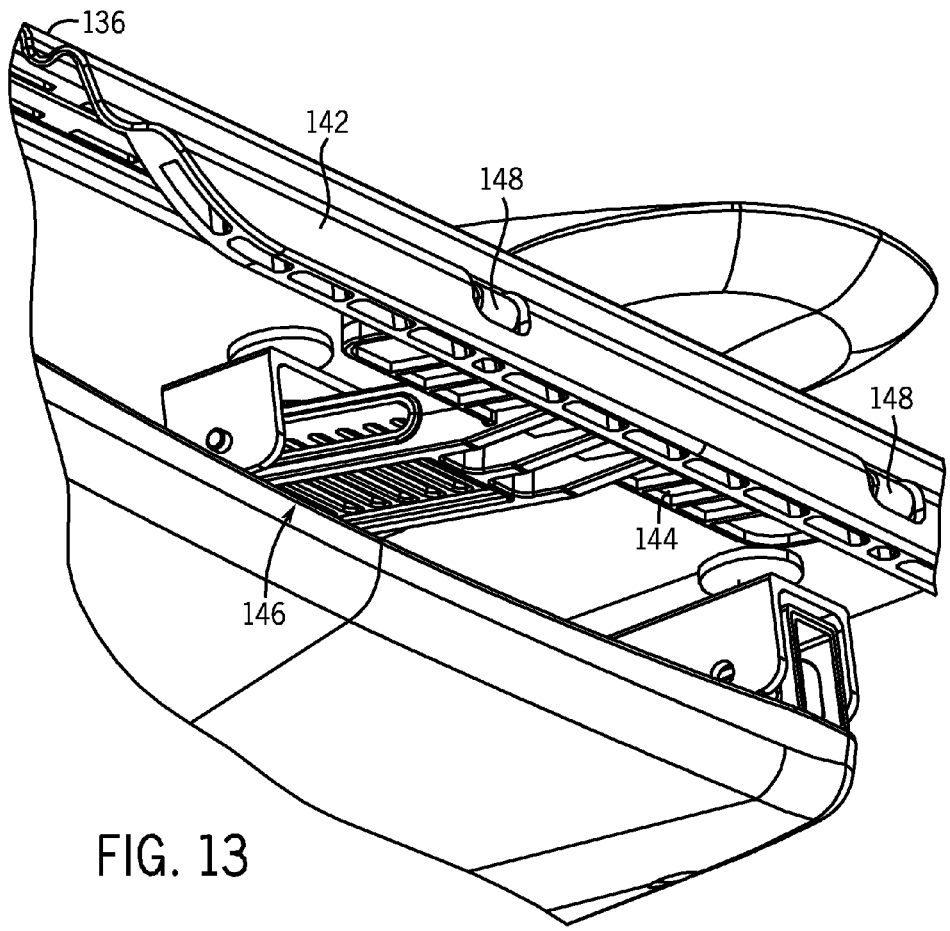
FIG. 13 is a partial isometric view of the adjustment device.
Figure 14:
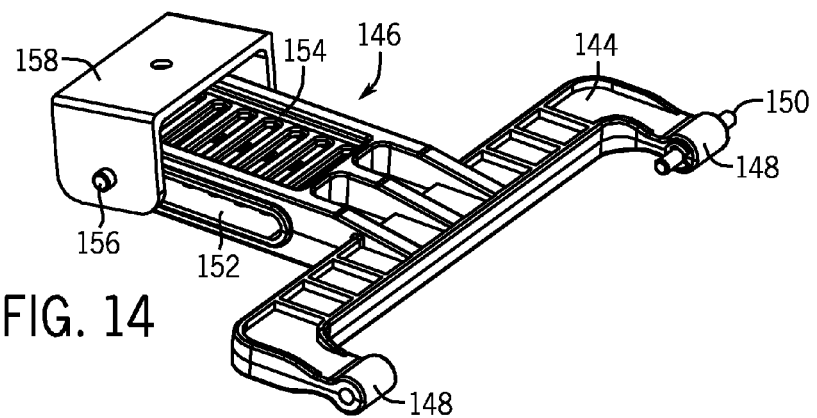
FIG. 14 is an isometric view of the adjustment device.

Referring now to FIG. 13, an outer end 142 of the thigh support portion 136 is securely attached to a U-shaped attachment portion 144 of an adjustment device 146. As illustrated in FIG. 14, the attachment portion 144 includes a pair of cylindrical ends 148 that each receive a pin 150 to rotatably connect the attachment portion 144 to the outer end 142 of the thigh support portion, as best illustrated in FIG. 13.

Figure 12:
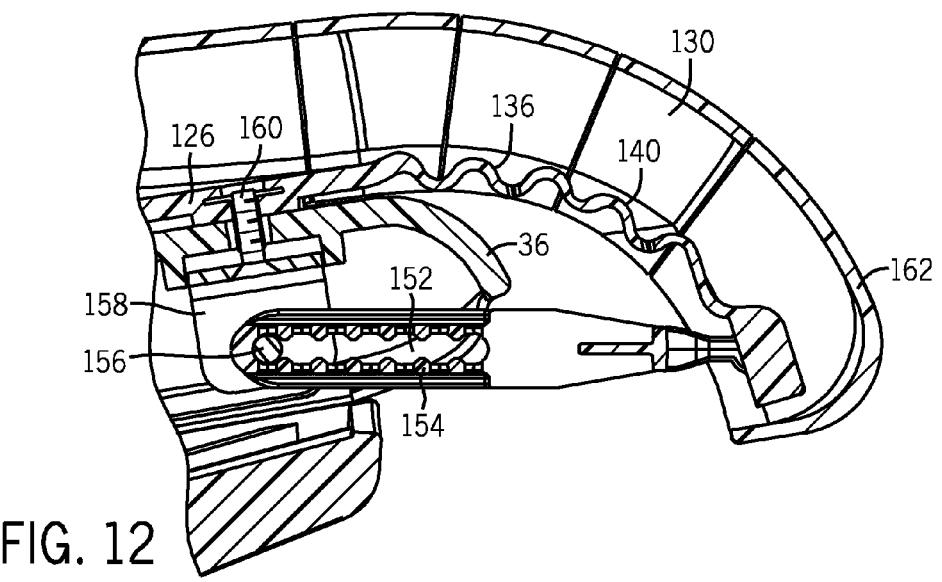
FIG. 12 is a partial section view showing the adjustment device for the thigh portion of the seat pad.

Referring back to FIG. 14, the adjustment device 146 includes an open channel 152 that includes a series of detents 154. As can be seen in FIGS. 12 and 14, the open channel 152 receives an adjustment pin 156 of a mounting bracket 158. The mounting bracket 158 is securely attached to the movable seat pan 36 and the inner seat member 126 by a connector 160, as best shown in FIG. 12. Thus, the mounting bracket 158 and thus the entire adjustment device 146 is movable along with the seat pan 36.

Referring back to FIG. 12, when a user wishes to reduce the overall depth of the chair seat, the user pushes inward on the outer end of the seat cushion 130, which causes the mounting pin 156 to move into the next slot formed in the open channel 152 by the series of detents 154. During this movement, the thigh support portion 136 flexes downward due to the series of convolutions 140. As can be understood in FIG. 12, the series of detents 154 define seven different, distinct settings for the length of the chair depth. In the embodiment shown in FIG. 12, the depth of the seat is at a maximum, since the adjustment pin 156 is in the rearmost slot formed by the series of detents 154.

If the chair seat is in an intermediate position, if the user wishes to increase the overall depth of the seat, the user pulls outward on the outer end 162, which causes the adjustment device to move relative to the mounting pin 156, causing the mounting pin 156 to enter into the next slot formed by the detents 154. As described, the user can adjust the depth of the seat by changing the angle of the thigh support portion 136 and thus the length of the seat cushion 130. Since the thigh support portion 136 and the mounting bracket 158 move along with the movement of the seat pan 36, the depth of the seat remains constant as the user reclines on the seat back.

Figure 15:
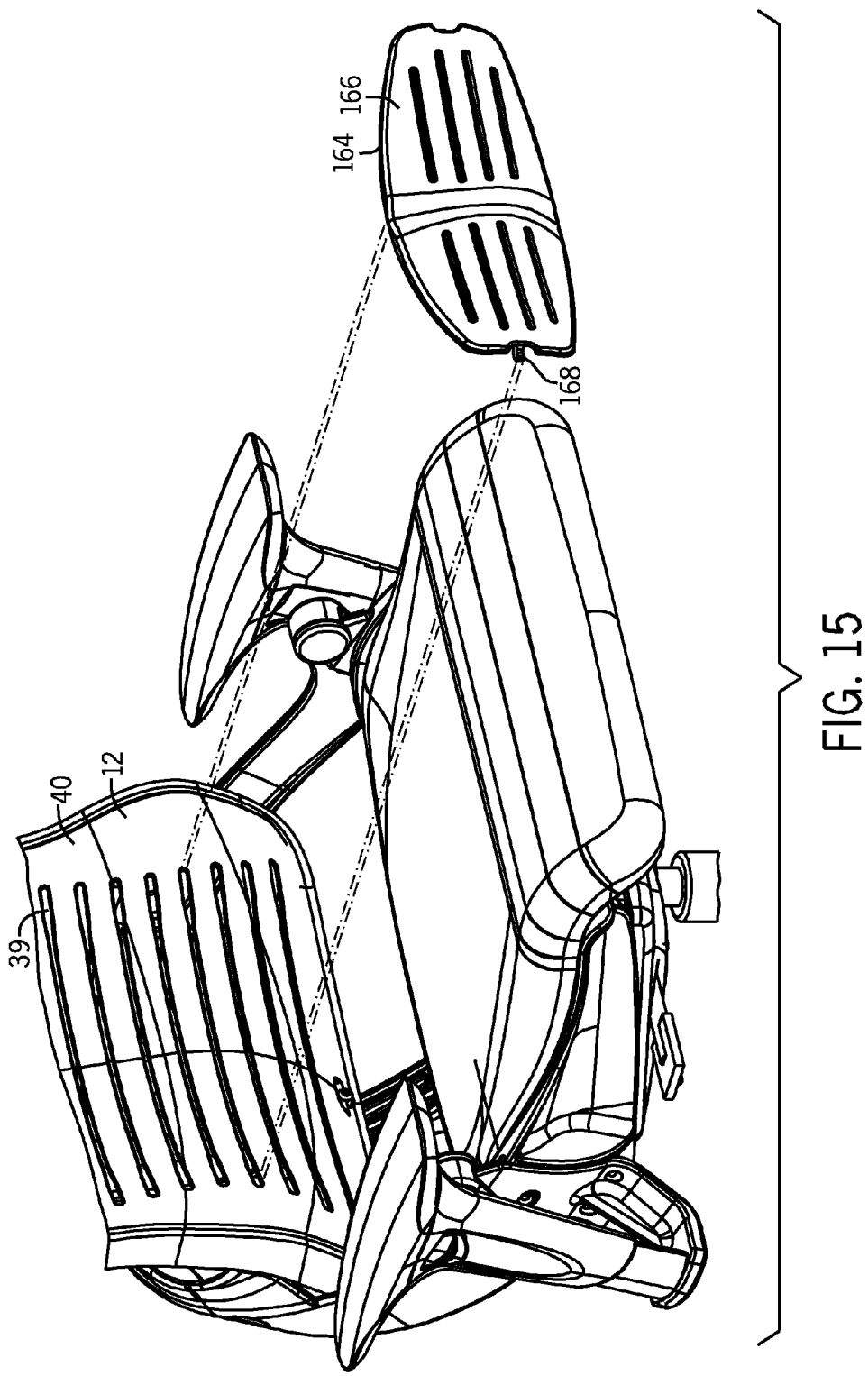
FIG. 15 is an exploded, isometric view illustrating the attachment of the lumbar support pad to the chair back.

In the embodiment of the invention illustrated, the chair back 12 shown in FIG. 15 is formed from a molded plastic and includes the series of slots 39 that allow the chair back to flex and also provide for a decorative appearance. In the embodiment shown in FIG. 15, a lumbar support member 164 can be mounted to the front face surface 40 of the chair back. The lumbar support member 164 is formed from a molded plastic material and has a curved outer surface 166. The lumbar support member 164 includes a pair of side tabs 168 that are sized to be received within the slots 39 formed in the chair back 12. To install the lumbar support member 164, a first side tab 168 is inserted into one of the slots 39 and slid to the outer end 170. In this manner, the side tab 168 is entrapped behind the chair back 12.

Once the first side tab is in place, the lumbar support member is flexed inwardly to decrease the overall length of the lumbar support member. Once the lumbar support member 164 is flexed inward, the opposite side tab (not shown) is positioned within the same slot 39. Once the side tab 168 is in position, the lumbar support member is allowed to flex back to its original position. The flexing of the lumbar support member 164 holds the side tabs 168 within the slots 39. Thus, the position of the lumbar support member 164 can be easily adjusted relative to the series of slots 39 formed in the chair back 12.

As illustrated in FIG. 1, the office chair 10 includes a head rest assembly 172 mounted to the chair back 12. The head rest assembly is an optional component that can be used with the office chair depending upon the user requirements.

Figures 16, 17:
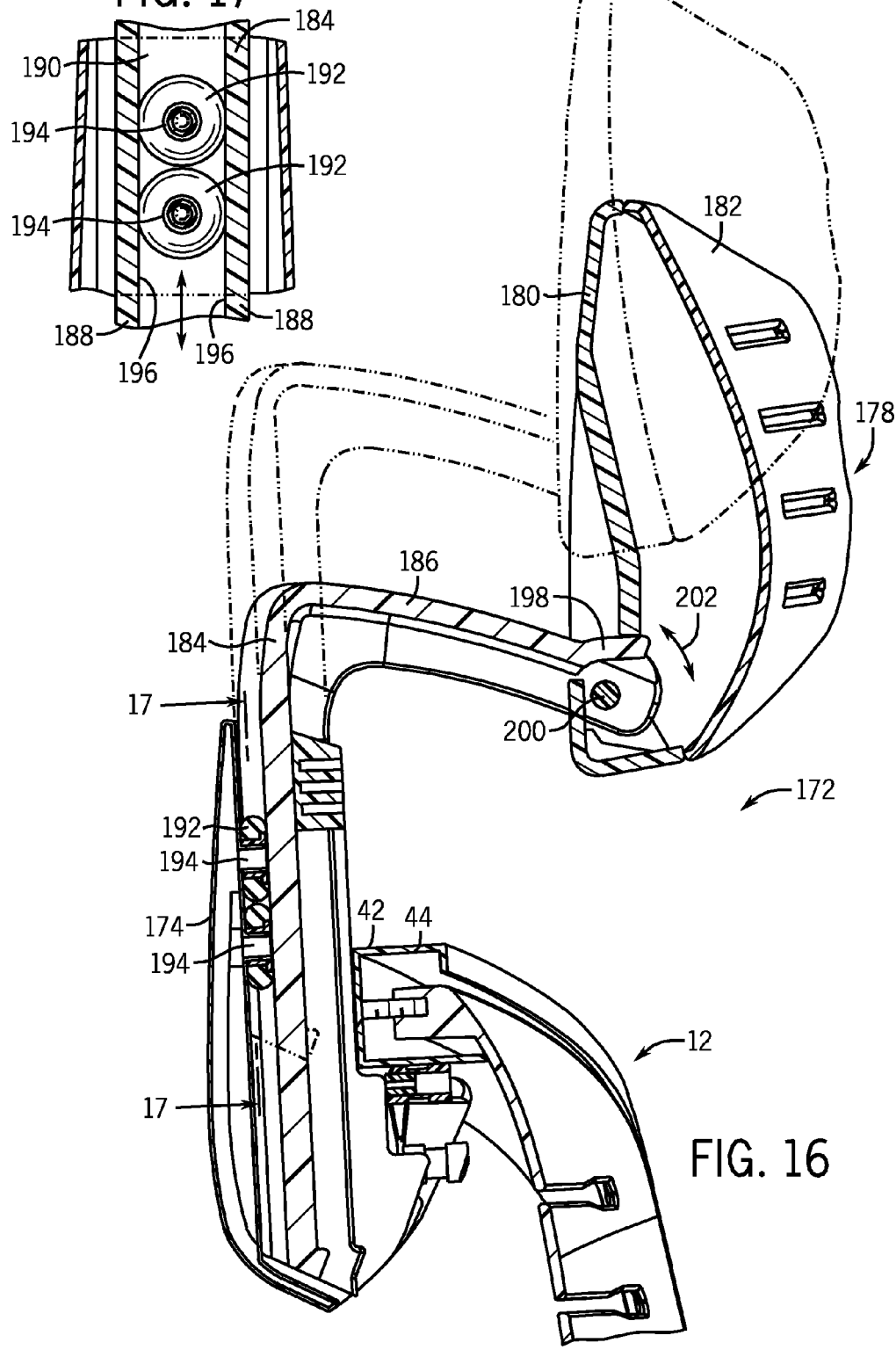
FIG. 16 is a section view of the adjustable head rest assembly.
FIG. 17 is a section view taken along line 17-17 of FIG. 16.

The head rest assembly 172 is shown in greater detail in FIG. 16. The head rest assembly 172 is securely mounted to the top edge 44 of the outer frame 42 that define the outer peripheral edge of the chair back 12. The head rest assembly 172 includes a mounting bracket 174 that attaches to the outer frame 42, as shown in FIG. 2. A head rest support arm 176 is movably mounted within the mounting bracket 174 to adjust the height of the head rest 178 from the top edge 44 of the chair back 12. The head rest 178 includes a back plate 180 that receives a head rest pad 182, which is best shown in FIG. 1. As can be seen in FIG. 1, the head rest pad 182 and the lumbar support member 164 are identical components and are both formed from a molded plastic material. The lumbar support member 164 and the head rest pad 182 are interchangeable with each other, which reduces the number of molded components required to assemble the office chair 10 shown in FIG. 1.

Referring back to FIG. 16, the head rest support arm 176 includes a vertical arm portion 184 that is integrally formed with an extension arm 186 that extends generally horizontally. As illustrated in FIG. 17, the vertical arm portion 184 includes a pair of spaced sidewalls 188 that generally define an open track way 190. The open track way 190 is sized to receive a pair of friction members 192. The friction members 192 are shown in FIG. 17 as each being mounted to a post 194. As illustrated in FIG. 16, each post 194 is formed as part of the mounting bracket 174. The entire mounting bracket 174 and the associated posts 194 are stationary and hold each of the friction members 192 in the position shown. In the embodiment illustrated in FIGS. 16 and 17, the friction members 192 are resilient O-rings which are formed from a rubber material. As illustrated in FIG. 17, the outer diameter of each of the friction members causes the friction member to compress against the inside edge 196 of each of the sidewalls 188. In this manner, the friction members 192 hold the vertical arm portion securely in the vertical position shown. However, when a force is applied to the head rest 178, the head rest can be moved vertically, as illustrated by the dashed lines in FIG. 16. When the head rest 178 reaches the desired position, the frictional interaction between the friction members 192 and the sidewalls 188 holds the head rest in the desired position.

As illustrated in FIG. 16, the outer end 198 of the extension arm 186 includes a pivot pin 200 that is used to mount the back plate 180 to the extension arm 186. The interaction between the pivot pin 200 and the back plate 180 allows the entire head rest 178 to pivot as illustrated by arrow 202. The pivoting movement of the head rest 178 allows the user to adjust the orientation of the head rest 178 for increased comfort.

Although not shown in the drawing Figures, the head rest pad 182 includes side tabs similar to the lumbar support member shown in FIG. 15. The side tabs allow the head rest pad 182 to engage the back plate in a similar manner as previously described with respect to the lumbar pad.

I claim:

1. A chair comprising:
   a seat base;
   a seat pan movable along a longitudinal axis relative to the seat base;
   a swing arm assembly pivotally mounted to the seat pan and movable with the seat pan relative to the seat base, the swing arm assembly including a swing arm extending from a first end positioned on a first side of the seat pan to a second end positioned on a second side of the seat pan;
   a chair back securely mounted to the swing arm, wherein both the first and second ends of the swing arm extend laterally outward past an outer perimeter of the chair back;
   a support bar mounted to the seat base and including an elongated curved support face that contacts the swing arm at the center of the swing arm between the first end and the second end to support the swing arm assembly, wherein reclining movement of the chair back causes the swing arm to move along the elongated curved support face of the support bar; and
   a roller positioned on the swing arm, wherein the roller engages and moves along the curved support face during reclining movement of the chair back.

2. The chair of claim 1 wherein the swing arm is pivotally connected to both the first side and the second side of the seat pan.

3. The chair of claim 2 further comprising a bias spring positioned between the seat base and the seat pan to bias the seat pan and the chair back into a retracted, upright position.

4. The chair of claim 1 further comprising a bias spring positioned between the seat base and the seat pan to bias the seat pan and the chair back into a retracted, upright position.

5. The chair of claim 4 wherein the curved support face of the support bar includes a receiving notch that receives the roller when the chair back and seat pan are in the retracted, upright position.

6. The chair of claim 3 wherein reclining movement of the chair back pivots the chair back relative to the seat pan and moves the seat pan forward relative to the seat base toward a reclined, extended position against the bias force.

7. The chair of claim 6 wherein the support bar is stationary and reclining movement of the chair back moves the support bar along the swing arm.

8. The chair of claim 1 further comprising a pair of side arms mounted to the seat pan such that the pair of side arms move along with movement of the seat pan.

9. The chair of claim 3 wherein the seat base is inclined from a back end to a front end to further restrict movement to a reclined, extended position.

10. The chair of claim 1 wherein the curved support face is curved along an arc that controls the movement of the chair back and the seat pan.

11. A chair comprising:
   a seat base;
   a seat pan movable along a longitudinal axis relative to the seat base, the seat pan being biased into a retracted position;

a swing arm extending from a first end positioned on a first side of the seat pan to a second end positioned on a second side of the seat pan, the swing arm being pivotally mounted to the seat pan and movable with the seat pan, the swing arm including an elongated guide track positioned on a center plane of the swing arm between the first end and the second end of the swing arm;

a chair back securely mounted to the swing arm wherein both the first and second ends of the swing arm extend past an outer perimeter of the chair back, wherein the chair back reclines upon pivoting movement of the swing arm relative to the seat pan; and a support bar mounted to the seat base, the support bar including a curved support face that is elongated in the center plane and received within the guide track formed on the swing arm such that during reclining movement of the chair back, the support face moves within the guide track of the swing arm.

12. The chair of claim 11 wherein the guide track includes a roller that engages the support face of the support arm.

13. The chair of claim 11 further comprising a bias spring positioned between the seat base and the seat pan to bias the seat pan and the chair back into the retracted, upright position.

14. The chair of claim 12 wherein the curved support face includes a receiving notch that receives the roller to further retain the chair back and seat pan in the retracted, upright position.

15. The chair of claim 14 wherein the seat base is inclined from a back end to a front end to further restrict movement of the seat pan to the reclined, extended position.

16. The chair of claim 11 further comprising:
a lumbar support pad removably attached to a front face of the chair back; and
a head rest assembly mounted to the chair back, the head rest assembly including a head rest pad, wherein the head rest pad and the lumbar support pad are identical components.

17. The chair of claim 16 wherein the head rest is adjustable relative to the chair back.

18. The chair of claim 11 further comprising:
a seat pad mounted to the seat pan; and
an adjustable thigh support assembly mounted to the seat pan and operable to adjust the depth of the seat pad.

19. The chair of claim 18 further comprising an inner seat member positioned between the seat pan and the seat pad, the inner seat member including a convoluted adjustment end section, wherein the adjustment end section is flexible and movable by an adjustment device to modify the depth of the seat pad.

* * * * *